US012564134B2

(12) United States Patent　　　　　　(10) Patent No.:　US 12,564,134 B2

Breure　　　　　　　　　　　　　　　　　(45) Date of Patent:　　　Mar. 3, 2026

(54) AGRICULTURAL DEVICE EQUIPPED WITH A PICK-UP MECHANISM AND A CROSS CONVEYOR BELT

(71) Applicant: PLOEGER OXBO EUROPE B.V., Roosendaal (NL)

(72) Inventor: Hendrik Willem Breure, Roosendaal (NL)

(73) Assignee: PLOEGER OXBO HOLDING B.V., Roosendaal (NL)

( * ) Notice: Subject to any disclaimer, the term of this patent is extended or adjusted under 35 U.S.C. 154(b) by 496 days.

(21) Appl. No.: 18/022,808

(22) PCT Filed: Aug. 19, 2021

(86) PCT No.: PCT/NL2021/050517

§ 371 (c)(1),
(2) Date: Feb. 23, 2023

(87) PCT Pub. No.: WO2022/045883

PCT Pub. Date: Mar. 3, 2022

(65) Prior Publication Data

US 2023/0309452 A1　　　Oct. 5, 2023

(30) Foreign Application Priority Data

Aug. 24, 2020　　(NL) ..................................... 2026328

(51) Int. Cl.
　*A01D 57/12*　　　(2006.01)
　*A01D 57/20*　　　(2006.01)
　*A01D 57/28*　　　(2006.01)

(52) U.S. Cl.
　CPC ............. *A01D 57/12* (2013.01); *A01D 57/20* (2013.01); *A01D 57/28* (2013.01)

(58) Field of Classification Search
　CPC ........ A01D 57/12; A01D 57/20; A01D 57/28; A01D 57/30; A01D 41/10; A01D 89/00
　　　　　　　　(Continued)

(56) References Cited

U.S. PATENT DOCUMENTS

| | | | | |
|---|---|---|---|---|
| 2,195,381 | A | * | 3/1940 | Patterson ............... A01D 45/22 56/192 |
| 5,822,959 | A | * | 10/1998 | Norton ................... A01D 41/10 56/364 |
| 6,079,194 | A | * | 6/2000 | Waldrop ................. A01F 29/01 56/220 |
| 9,192,102 | B2 | * | 11/2015 | Gantzer ............... A01D 89/008 |

(Continued)

FOREIGN PATENT DOCUMENTS

| | | | | | |
|---|---|---|---|---|---|
| DE | 10320042 | A1 | * | 6/2004 | ........... A01D 80/005 |
| DE | 102010010862 | A1 | * | 9/2011 | ............. A01D 84/00 |

(Continued)

OTHER PUBLICATIONS

International Search Report (ISR) for PCT/NL2021/050517 mailed Oct. 27, 2021 (5 pages).
Written Opinion (WO) for PCT/NL2021/050517 mailed Oct. 27, 2021 (6 pages).

*Primary Examiner* — Joseph M Rocca
*Assistant Examiner* — Sunny D Webb
(74) *Attorney, Agent, or Firm* — Jason A. Smith; Shumaker, Loop & Kendrick, LLP

(57) ABSTRACT

A device, which is movable over ground in a direction of travel, where the device is equipped with at least one pick-up mechanism for picking up a product from the ground, as well as at least one conveyor belt arranged to convey the picked up material in at least one direction extending sidewards with respect to the direction of travel, and to deposit said material on the ground, wherein the pick-up comprises at least one pick-up element configured to pick up product from the ground by means of rotation about an axis extending substantially parallel with respect to the convey-ing direction of conveyor belt, wherein the device is (Continued)

equipped with a guiding unit forming an ascending ramp for the product, the guiding unit being arranged to move the picked up product towards the conveyor belt at an angle of at least 20 degrees with respect to a horizontal plane. A self-propelled agricultural machine and a trailed agricultural machine being equipped with such a device.

19 Claims, 9 Drawing Sheets

(58) Field of Classification Search
USPC .... 56/14.4, 344, 14.5, 192, 364, DIG. 21, 7; 198/518
See application file for complete search history.

(56) References Cited

U.S. PATENT DOCUMENTS

| | | | | |
|---|---|---|---|---|
| 9,538,709 | B2 * | 1/2017 | Bassett | ............... A01D 89/002 |
| 9,999,178 | B2 * | 6/2018 | Leiston | ............... A01D 89/003 |

FOREIGN PATENT DOCUMENTS

| | | | | |
|---|---|---|---|---|
| DE | 202017000595 | U1 | 5/2018 | |
| DE | 102017001012 | | 8/2018 | |
| EP | 3326448 | A1 | 5/2018 | |
| EP | 3552477 | A1 * | 10/2019 | ............ A01D 78/02 |
| EP | 3590323 | A1 * | 1/2020 | ............ A01D 84/00 |
| WO | 2020/046114 | A1 | 3/2020 | |

* cited by examiner

AGRICULTURAL DEVICE EQUIPPED WITH A PICK-UP MECHANISM AND A CROSS CONVEYOR BELT

TECHNICAL FIELD AND BACKGROUND

The invention relates to a device that is movable in a direction of travel over land, wherein the device is provided with at least one pick-up mechanism for picking up product from the land, as well as at least one conveyor belt, wherein, by means of the conveyor belt, the product picked up by the pick-up mechanism is to be conveyed in at least one direction of transport extending sideways relative to the direction of travel and is to be deposited on the land, wherein the pick-up mechanism comprises at least one pick-up that is configured to pick up product from the land by means of a rotating motion about a rotation axis extending substantially parallel to the direction of transport of the conveyor belt.

The invention further relates to a self-propelled agricultural machine that is provided with a device of this kind, as well as to a pulled agricultural machine that is provided with a device of this kind. Finally the invention relates to the use of an agricultural machine.

WO2020/046114 A1 presents and describes a self-propelled agricultural machine, more particularly a so-called merger, which is provided with two of the devices described above (called units). Said devices are indicated with the reference numbers 3*a*, 3*b* in the description of the figures of this patent document.

Although the known merger, which is provided with two devices, gives excellent results for carrying out agricultural processing on the land at relatively high speeds of travel, one object of the present invention is further improvement of the agricultural processing that is to be carried out by means of the device. In a further aspect, one object is to improve the product flow between the pick-up mechanism and the conveyor belt.

SUMMARY

At least one of these objects is achieved with the device for carrying out agricultural processing.

The device is movable in a direction of travel over land, wherein the device is provided with at least one pick-up mechanism for picking up product from the land, as well as at least one conveyor belt. By means of the conveyor belt, the product picked up by the pick-up mechanism is to be conveyed in at least one direction of transport extending sideways relative to the direction of travel and is to be deposited on the land. The pick-up mechanism comprises at least one pick-up that is configured to pick up product from the land by means of a rotating motion about a rotation axis extending substantially parallel to the direction of transport of the conveyor belt. The device further comprises a guide member forming a rising slope for the product, by means of which the product picked up from the land by means of the pick-up mechanism is to be moved towards the conveyor belt at an angle of at least 20 degrees relative to a horizontal plane. By means of the rising slope formed by the guide member, the product, for example grass, is to be moved by means of the pick-up mechanism at relatively high speed slanting upwards as well as backwards towards the conveyor belt. In contrast to the "pushing" of the product between the pick-up mechanism and the conveyor belt already known from WO2020/046114, wherein the product flow between pick-up mechanism and conveyor belt extends substantially in a horizontal direction, in the claimed device the product flow is altered by means of the guide member so that the product flow between pick-up mechanism and conveyor belt no longer extends substantially in the horizontal direction, but also comprises a vertical component, because the slope for the product formed by the guide member is at least 20 degrees. In the known "pushing", product for example present on the conveyor belt is to be pushed through backwards as new material arrives, and this "pushing through" on a conveyor belt, especially in the case of a wet and/or stiff product, leads to undesirable accumulations and clogging on the conveyor belt, and, in consequence thereof, to undesirable accumulations and clogging in the product deposited on the land by the conveyor belt. The guide member forming a slope for the product improves the product flow between the pick-up mechanism and the conveyor belt, the product flow being improved drastically in the case of a relatively wet product. A product outlet side of the guide member directed towards the conveyor belt is located, owing to the slope, at a height relative to the conveyor belt, for example of at least 100 mm, so that, as a result of a falling motion under the effect of gravity, the product falls from the product outlet side directly or indirectly onto the conveyor belt. Owing to the falling motion of the product towards the conveyor belt provided by means of the guide member, accumulation/clogging is prevented or in any event minimized. In addition, the height difference between product outlet side and the conveyor belt, providing the falling motion of the product, prevents, directly after the pick-up mechanism, the product being pulled by the conveyor belt at an angle for sideways deposition by means of the conveyor belt, as is the case if the product flow between pick-up mechanism and conveyor belt extends substantially in a horizontal direction, so that the chance of clogging as well as an uneven product flow is also prevented or minimized. The guide member mounted between pick-up mechanism and conveyor belt provides a height of fall for the product between guide member and conveyor belt, said height of fall being for example at least 100 mm. Furthermore, by means of the guide member forming the slope, it is possible to fill the conveyor belt better, so that the sideways deposition will be more uniform, which is for example especially desirable for forming a windrow. A windrow is a row of plants that has been deposited on the land for example by a merger for subsequent processing. The subsequent processing may for example be chopping, pressing or picking up with a self-loader. The device comprises a stationary guide member. "Stationary" means a passive guide member that is not driven by means of a drive in order to move the product actively. The stationary guide member is consequently relatively low-maintenance, does not consume any energy and is therefore cost-effective and easy to produce. The stationary guide member is even suitable for retrofitting on a device relatively easily to obtain a device as described in this document.

In one aspect, the guide member forms an inclined guideway between a product inlet side and a product outlet side of the guide member, wherein a percentage rise of the inclined guideway between the product inlet side and the product outlet side is at least 50%, preferably at least 60%. This percentage rise of the guideway ensures especially uniform windrows formed with the device, of for example hay, grass or alfalfa, as a result of an improved product flow between pick-up mechanism and conveyor belt as well as an improved product flow on the conveyor belt itself. Viewed in the direction of travel, the product inlet side of the guide member is located behind the rotation axis of the pick-up. A percentage rise (gradient) of 50% means that between the product inlet side and the product outlet side, the guideway is 50 cm higher per metre of horizontal distance. A percentage rise of 100% corresponds to a slope of 45 degrees, so that the guideway may also comprise a percentage rise greater than 100%. The maximum percentage rise of the guideway is about max. 180%, corresponding to a slope of about 80 degrees between the product inlet side and the product outlet side relative to the horizontal plane. The guideway does not have to rise continuously with the same percentage rise; the percentage rise may for example be lower at the start near the product inlet side than near the product outlet side, or for example be maximum in the middle section between the product inlet side and the product outlet side.

In another aspect, a height difference provided by means of the guide member, viewed in a vertical direction, is at least 100 mm. This kind of height difference provided by the guide member ensures a nice ski jump-like slope for the product coming off of the pick-up mechanism so that the product is to be moved in a direction partly turned away from the land and then dropped down onto the conveyor belt. Besides the vertical direction of movement to be provided by means of the guide member, the product will also be moved in a direction opposite to the direction of travel, towards the conveyor belt. From the inlet side, the guideway only comprises a rising course, optionally with variable gradients between the inlet side and the outlet side. In a further aspect, a longitudinal side of the conveyor belt facing the guide member is located at a vertical distance from the land that is less than a distance measured vertically between the land and a mid-point of the guideway between the product inlet side and the product outlet side. A guide member configured in this way provides a height difference between the product outlet side and the conveyor belt with which an improved product flow between pick-up mechanism and conveyor belt is achievable and a more uniform distribution of product on the conveyor belt can be obtained.

By means of the guide member, forming the rising slope for the product, the (average) landing position of the product on the conveyor belt can be determined beforehand. During production of the device, the most usual slope and corresponding (average) landing position can be supplied as standard and optionally on request be adjusted for example by adjusting the average slope angle of the slope by fitting a second guide member with for example a different slope or with a slope with a different course, in place of the first (standard) guide member. It is thus possible to position the (average) landing position for example farther back on the conveyor belt. The conveyor belt may also comprise a slope rising opposite to the direction of travel, i.e. at a relatively small angle of for example less than 20 degrees, so that with a landing position chosen farther back, the product, after landing, can be distributed better between the longitudinal sides of the conveyor belt extending parallel to the direction of transport. By means of the guide member, the product flow on the conveyor belt may consequently also be distributed more uniformly and consequently be improved. It is additionally possible for the slope to be formed by the guide member between the pick-up mechanism and the conveyor belt to be made adjustable. In this way, for example the landing position on the conveyor belt can be varied to improve deposition. Also, depending on circumstances such as type of product, the state of the product (wet/dry), conditions of the land, the distance from the guide member to further components of the device and/or weather conditions, a greater or a smaller slope of the guide member may be desired for achieving an improved product flow and/or more optimum filling of the conveyor belt. The slope can be set by an operator, for example from the cabin of a merger.

In another aspect, the guide member is provided with a curved plate-shaped element forming the slope. This relatively simply constructed guide member provides, reliably and relatively cost-effectively, the advantages of the guide member described above.

The guide member may also be connected to the device in a partly floating manner. In this way the guide member can be made relatively flexible. A flexible guide member is advantageous if objects, for example such as stones, are picked up with the device or if there is contact with other components of the device, wherein the at least partial flexibility of the guide member can ensure that the at least one part of the guide member can spring, so that the likelihood of damaging the guide member can be minimized. By choosing a plate-shaped or strip-shaped guide member with relatively small height (thickness), for example a height (thickness) between 10 and 80 mm, the flexibility can be increased further.

In a further aspect, the pick-up of the pick-up mechanism extending substantially in the direction of the rotation axis is provided with baleen-shaped strips, which are mounted behind one another viewed in the direction of the rotation axis in such a way that a pitch distance is present between two strips, which defines a slot-shaped opening, in which a number of movable pick-up teeth are mounted rotatably about the rotation axis relative to the strips, which, viewed in a radial direction from the rotation axis, project relative to the strips. The baleen-shaped strips are stationary, i.e. in operation, these strips do not move the product actively, only passively. In other words, the baleen-shaped strips do not rotate about the rotation axis of the pick-up, and in operation are stationary relative to the rotation axis of the pick-up. In particular, with a pick-up configured in this way, the guide member may be formed by extending the baleen-shaped strips, wherein the extended segments of the strips form the guide member. By means of such an embodiment, a relatively uniform product flow can be provided without undesirable transitions between the pick-up mechanism and the guide member. In this embodiment, the baleen-shaped elements form both the guide member, more particularly the guideway over which the product is moved partly upwards, as well as a component of the pick-up of the pick-up mechanism.

The device is further provided with a feed rotor, which is mounted above the pick-up mechanism, wherein, between the feed rotor and the pick-up of the pick-up mechanism, a product feed-through is to be provided in the direction of the conveyor belt and/or between the feed rotor and the guide member. The feed rotor may be configured as a windrow roll, i.e. a relatively robust toothless feed rotor, wherein during operation of the device, contact between windrow roll and the guide member, for example as a result of irregularities in the land or obstacles in the land so that the guide member may move towards the feed rotor, does not lead to or only leads to minimal damage of the windrow roll and/or guide member. In addition, the guide member may be made flexible, so that the guide member is to be moved at least partially in the direction of the land after contact with the windrow roll, to minimize the risk of damage. A relatively flexible guide member is for example relatively easy to produce by means of the extended baleen-shaped stationary strips, wherein the extended segments of the strips form the guide member.

The feed rotor may also be provided with feed rotor teeth, wherein the guide member is provided with recesses, configured to receive, in operation, a part of each feed rotor tooth turned away from the rotation axis of the feed rotor. Viewed in the direction of the rotation axis of the feed rotor, the feed rotor teeth may be mounted next to each other at an equal pitch distance. In the case of a device not moving in the direction of travel, ends of the feed rotor teeth that are directed towards the guide member are located at a distance from the guide member, said distance being selected in such a way that a desired uniform product flow is to be achieved thereby between feed rotor and guide member, and in operation, the risk of contact between the feed rotor and the guide member is limited. Contact may for example arise as a result of irregularities in the land or obstacles in the land so that the guide member may be displaced towards the feed rotor and/or conversely the feed rotor may be displaced towards the guide member, wherein contact between the rotating teeth of the feed rotor and the guide member may damage the feed rotor teeth and/or the guide member. To rule out contact or in any case drastically minimize the chance thereof, the guide member may be provided with the afore-mentioned recesses, into which the feed rotor teeth are to be moved at least partially if the guide member is displaced strongly upwards in a direction away from the land. The pitch distance between the recesses for receiving the feed rotor teeth corresponds to the pitch distance between the feed rotor teeth, wherein it is possible that there are more recesses than feed rotor teeth. If the guide member is formed by extending the baleen-shaped strips, wherein the extended segments of the strips form the guide member, the slot-shaped openings may be extended into the guide member for forming the recesses for at least partly receiving the rotor feed teeth. Because the slot-shaped openings also form the recesses in the extended segments, the feed rotor teeth are also aligned with the pick-up teeth of the pick-up, so that the grip on the product can be increased and the distance between the pick-up and the feed rotor can be set relatively small without risk of damage of the teeth. The pitch distance between the feed rotor teeth corresponds to the pitch distance of the pick-up teeth, or the pitch distance between the feed rotor teeth is a multiple of the pitch distance of the pick-up teeth. Conversely, it is also possible that the pitch distance between the pick-up teeth is a multiple of the pitch distance of the feed rotor teeth. By means of the recesses in the guide member, it is possible to minimize the distance between the ends of the teeth and the guide member with or without a greatly reduced risk of damage during operation of the device through contact between the feed rotor teeth and the guide member. A minimum distance between feed rotor and guide member increases the grip on the product. This increase in grip may increase the speed of the product flow towards the conveyor belt. Moreover, the increase in grip may be particularly advantageous if the product flow between the guide member and the feed rotor must travel over a relatively steep slope formed by the guide member to reach the height between product outlet side of the guide member and the conveyor belt for providing the desired falling motion of the product towards the conveyor belt. The rotary speed of the feed rotor may also be adjusted, for example increased, in order to adapt the landing position of the product on the conveyor belt by means of the guide member.

In a further aspect, the device is provided with a deflecting member for deflecting product arriving from the guide member onto a conveyor belt of the conveyor belt. The deflecting member is for example a deflecting member extending substantially vertically, mounted near a longitudinal side of the conveyor track turned away from the guide member, wherein the product arriving from the guide member may come up against the deflecting member and then be led downwards towards the conveyor belt. This prevents product moved upwards via the guide member being moved away over the conveyor belt.

The aspects described above as well as other aspects of the device or the agricultural machine will be explained hereunder on the basis of exemplary embodiments in combination with the figures. The invention is not, however, limited to the exemplary embodiments described hereunder. Rather, a number of adaptations and modifications are possible, which also make use of the idea of the invention claimed in the claims and consequently fall within the scope of protection. In particular, the possibility is mentioned of combining the features/aspects that are only mentioned in the description and/or are shown in the figures, with the features of the claims in so far as compatible.

DETAILED DESCRIPTION

Figure 1A:
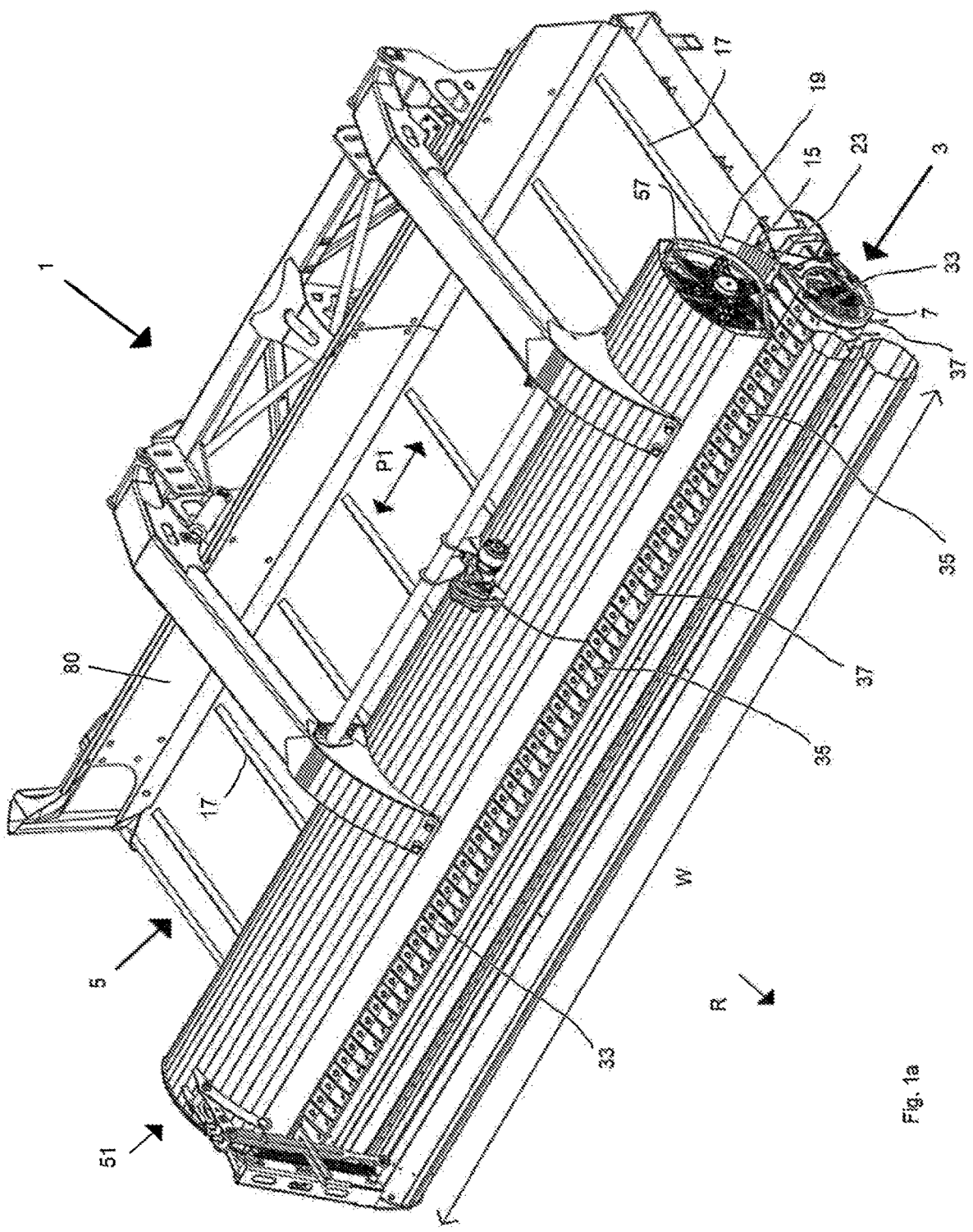
FIGS. 1a-d show perspective views as well as a cross-section (FIG. 1c) and an enlarged cross-section (FIG. 1d) of a first embodiment of a device for use in an agricultural machine.
Figure 1B:

In the figures, the same components are indicated with the same reference signs.

The device 1, 101, 201 shown in the figures may be incorporated both in a self-propelled agricultural machine and in a pulled agricultural machine. In the case of application of the device in a merger such as is known from WO2020/046114 A1, the merger comprises at least two devices 1; 101; 201, so that besides deposition to the left or right of the merger, central deposition is also possible. For details of a merger, reference is made to WO2020/046114 A1. Besides application of the device 1; 101; 201 in a self-propelled agricultural machine, such as said merger, the device 1; 101; 201 may also be employed in a pulled agricultural machine (not shown).

By means of the device 1; 101; 201 shown in the figures, in operation, an agricultural working (processing) of the land is to be carried out. More particularly, each device 1; 101; 201 of elongated configuration shown is provided with a product pick-up mechanism 3; 103 for picking up a plant material product from the land, for example for picking up hay or a similar product, as well as a conveyor belt 5, wherein by means of the conveyor belt 5, product picked up by means of the pick-up mechanism 3; 103 is to be conveyed in one of the directions represented by arrow P1, i.e. sideways relative to the direction of travel R of the agricultural machine (not shown) in a direction of transport (P1) and is to be deposited on the land. The pick-up mechanism 3; 103 comprises at least one pick-up 7; 107, which is configured to pick up product from the land by means of a rotating motion about a rotation axis 9; 109 extending substantially parallel to the direction of transport P1 of the conveyor belt. The conveyor belt will deposit product on the land to the left or right relative to a direction of travel R, for example for forming a windrow.

In the device 1; 101; 201, viewed in the direction of travel, a guide member 15; 115, forming a rising slope for the product, is mounted between the pick-up mechanism 3; 103 and the conveyor belt 5 and is positioned in such a way relative to the pick-up mechanism that the product picked up from the land is to be moved by means of the pick-up mechanism via guide member 15; 115 to the conveyor belt 5 in such a way that the product flow between pick-up 7; 107 and the conveyor belt 5 is moved by means of the guide member slanting upwards (in a direction turned away from the land L) as well as backwards (against the direction of travel R).

The conveyor belt 5 comprises vertical ribs 17 extending transversely to the direction of transport P1 for improving the grip of the conveyor belt on the product. The ribs 17 on the conveyor belt 5 are optional for the device 1; 101; 201 described in this document and may be omitted. The conveyor belt 5 comprises a slope rising opposite to the direction of travel R, i.e. a slope relative to a horizontal line 27' (FIG. 1c) at a relatively small angle α of for example less than 20 degrees. The pick-up 7; 107, the stationary guide member 15; 115 as well as the conveyor belt 5 are connected together to form a unit of the device 1; 101; 201, and this unit can be tilted relative to the land, so that the angle α is changed. In the figures, the device is in a neutral position, wherein the unit can tilt for example 5-10 degrees forwards and backwards, relative to the neutral position. By tilting, the working depth of the pick-up 7; 107 can be set to the desired working depth in order to pick up product from the land. A longitudinal side 21 of the conveyor belt turned away from the guide member is placed, by tilting, at a different vertical height, said vertical height being represented in FIG. 1c by arrow A2. A working width W of the guide member 15; 115 extending transversely to a product guiding direction of the guide member 15; 115 corresponds substantially to a working width W of the pick-up mechanism 3, with which product is to be picked up from the land by means of the pick-up mechanism 3. The device 1; 101; 201 is provided with a deflecting member 80 for deflecting product arriving from the guide member 15; 115, towards the conveyor belt 5.

Figure 1C:
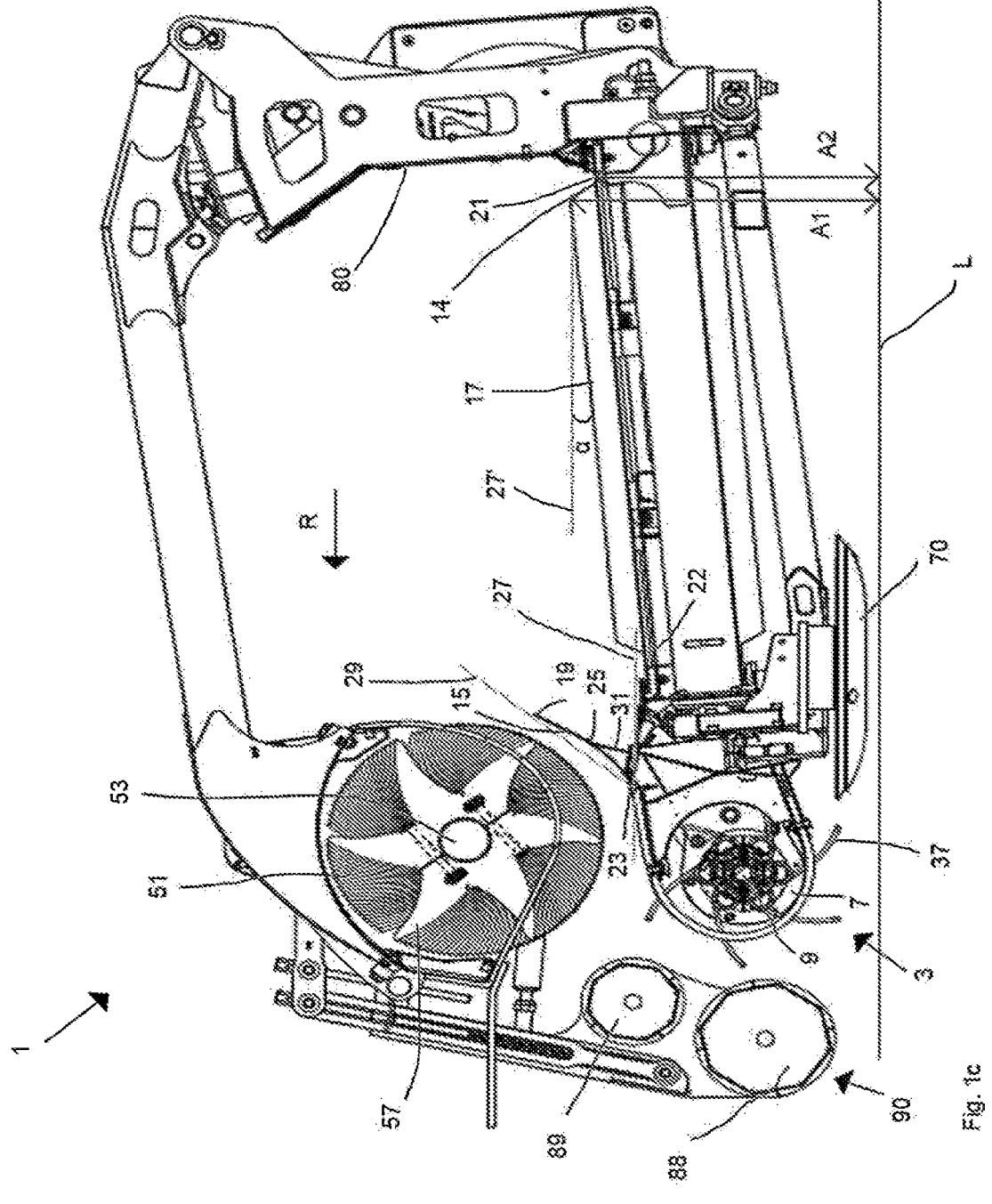
Figure 1D:
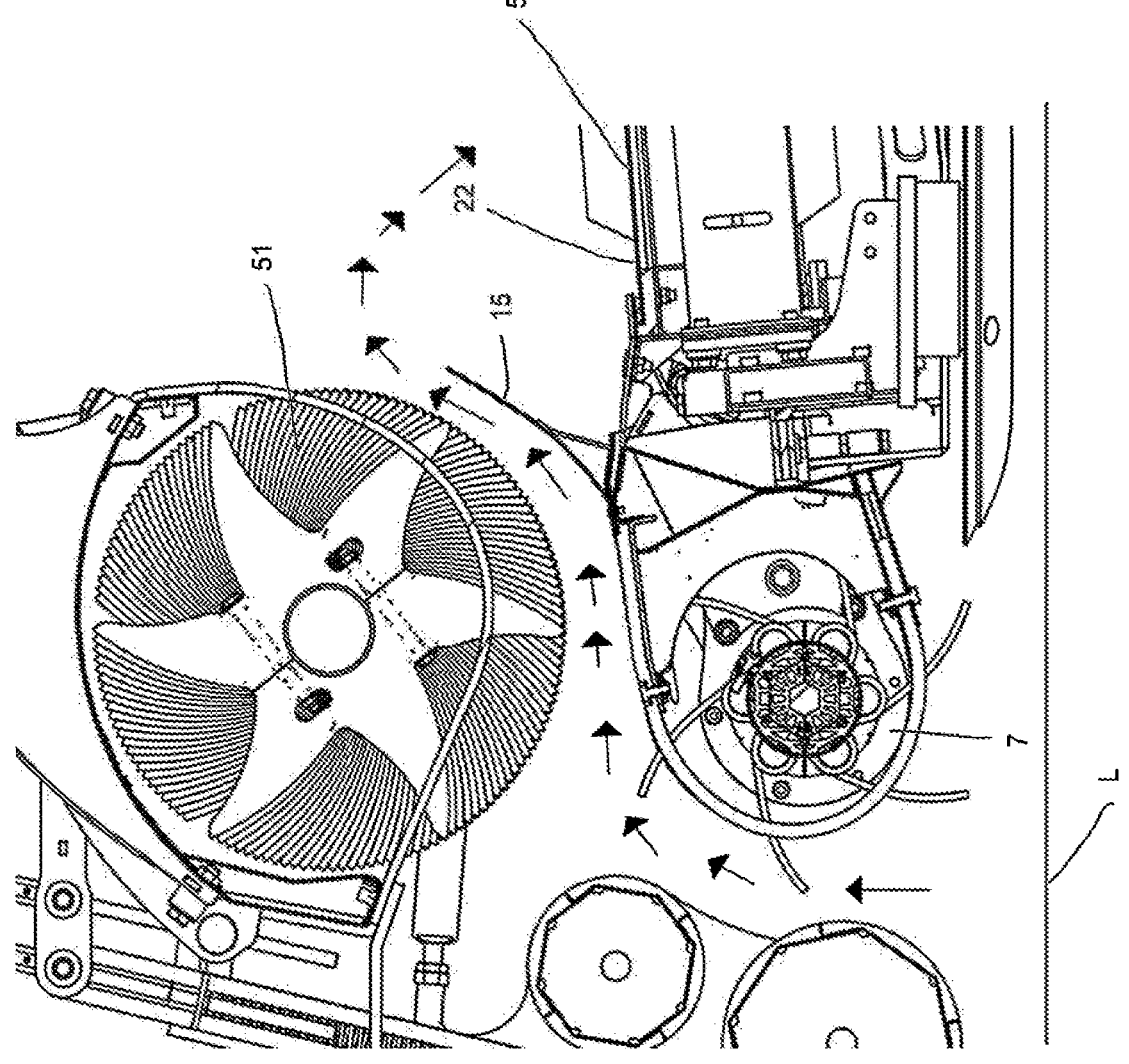
Figure 2A:
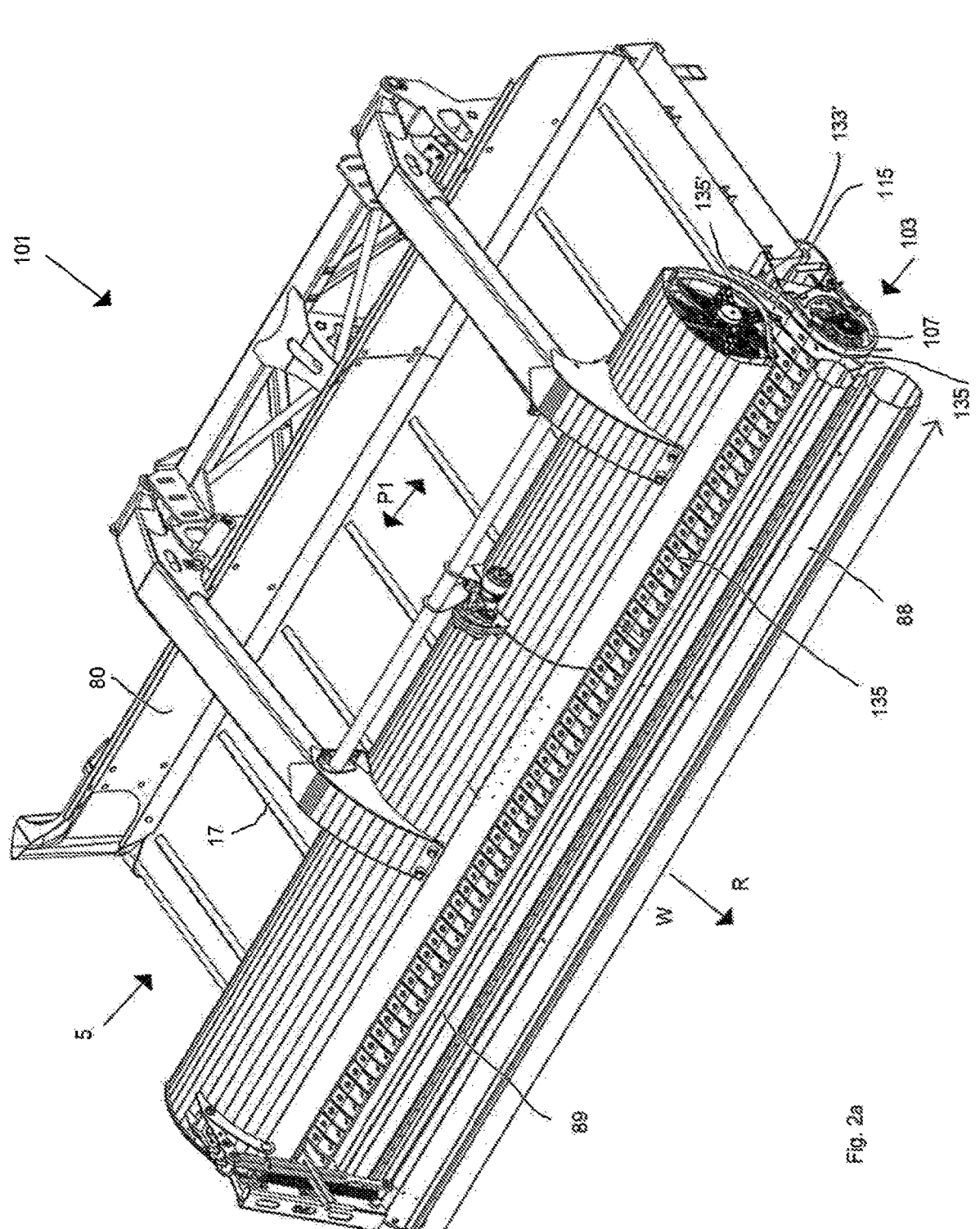
FIGS. 2a-c show perspective views as well as a cross-section of a second embodiment of a device for use in an agricultural machine.
Figure 2B:
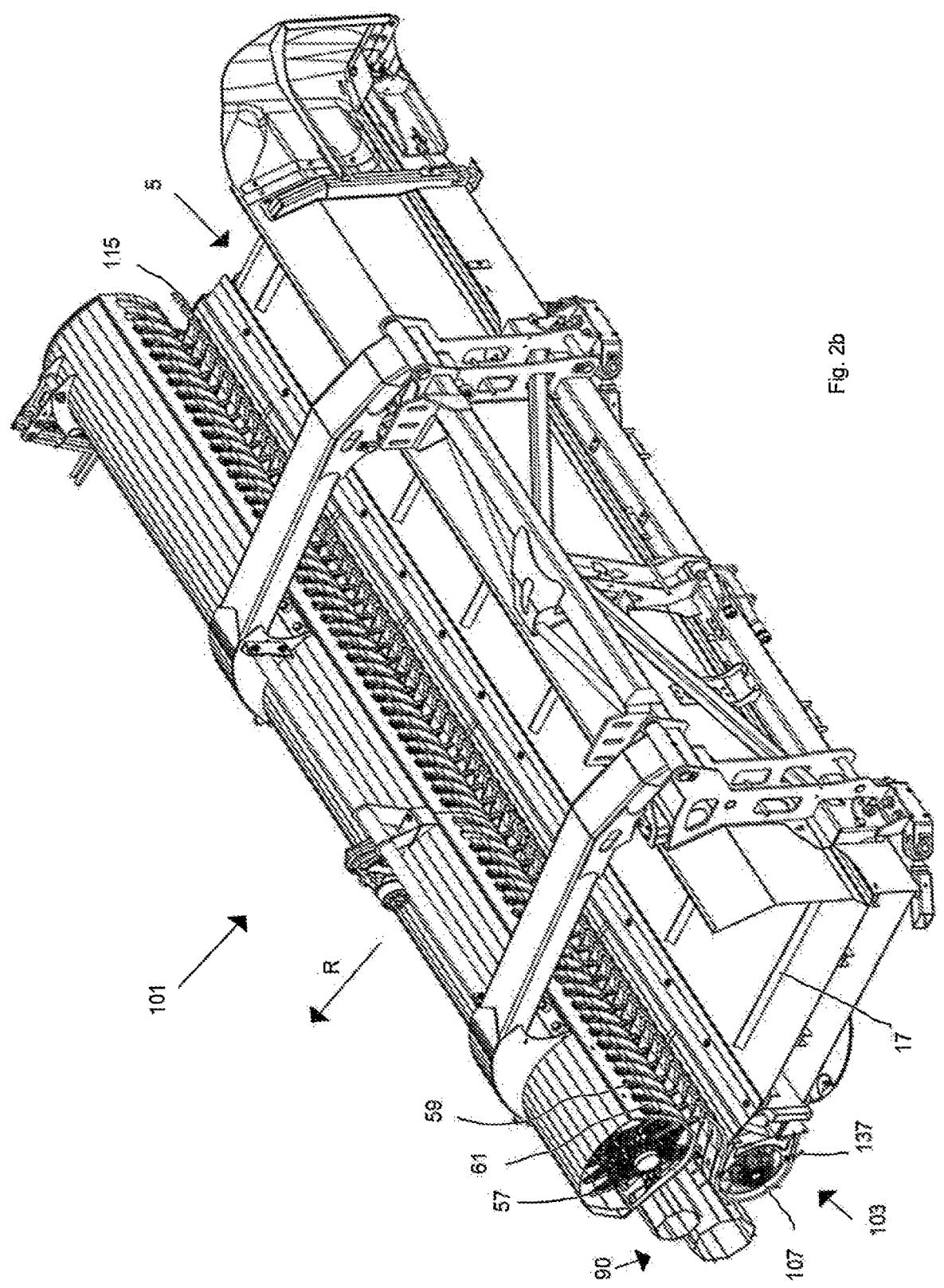
Figure 2C:
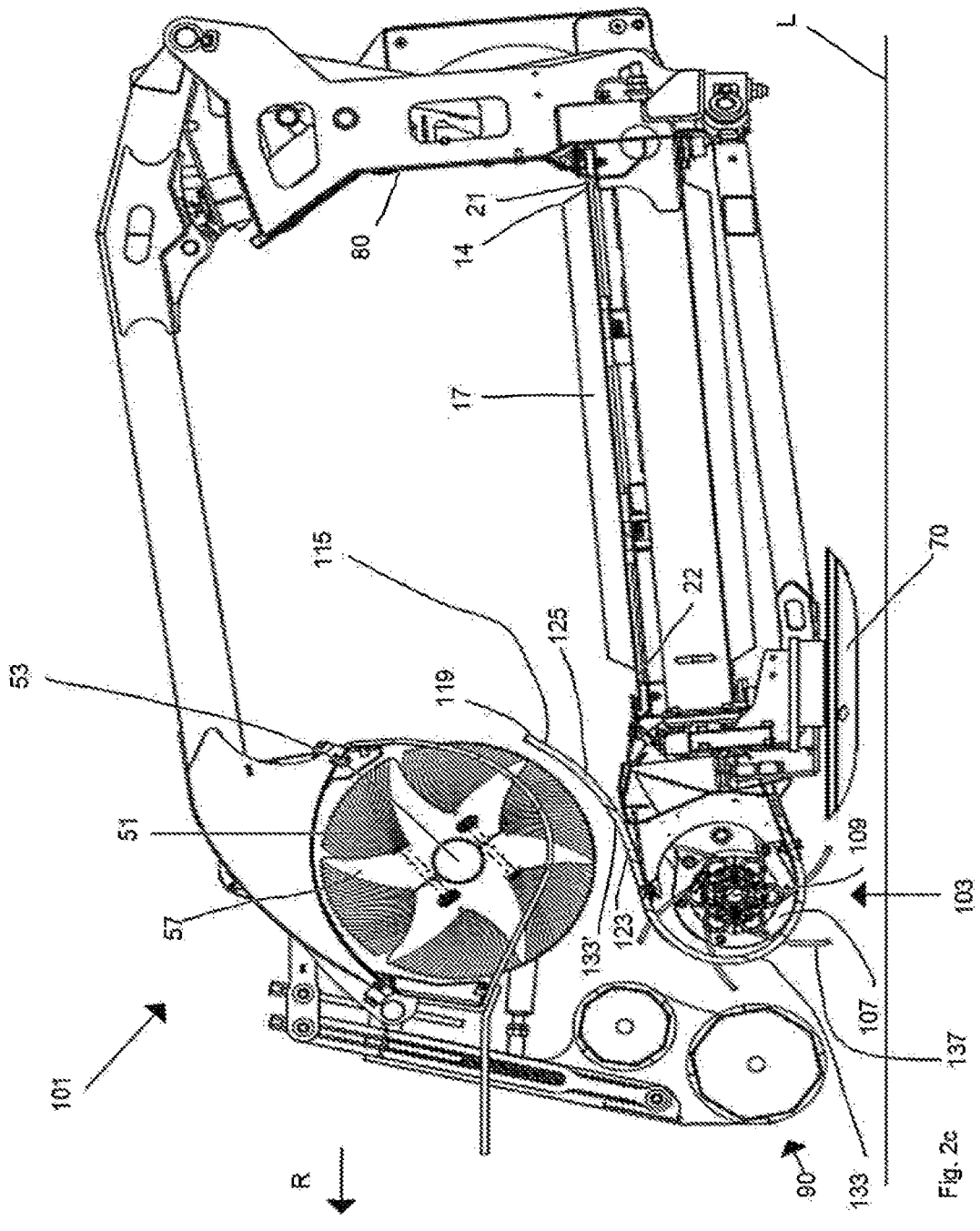
Figure 3A:
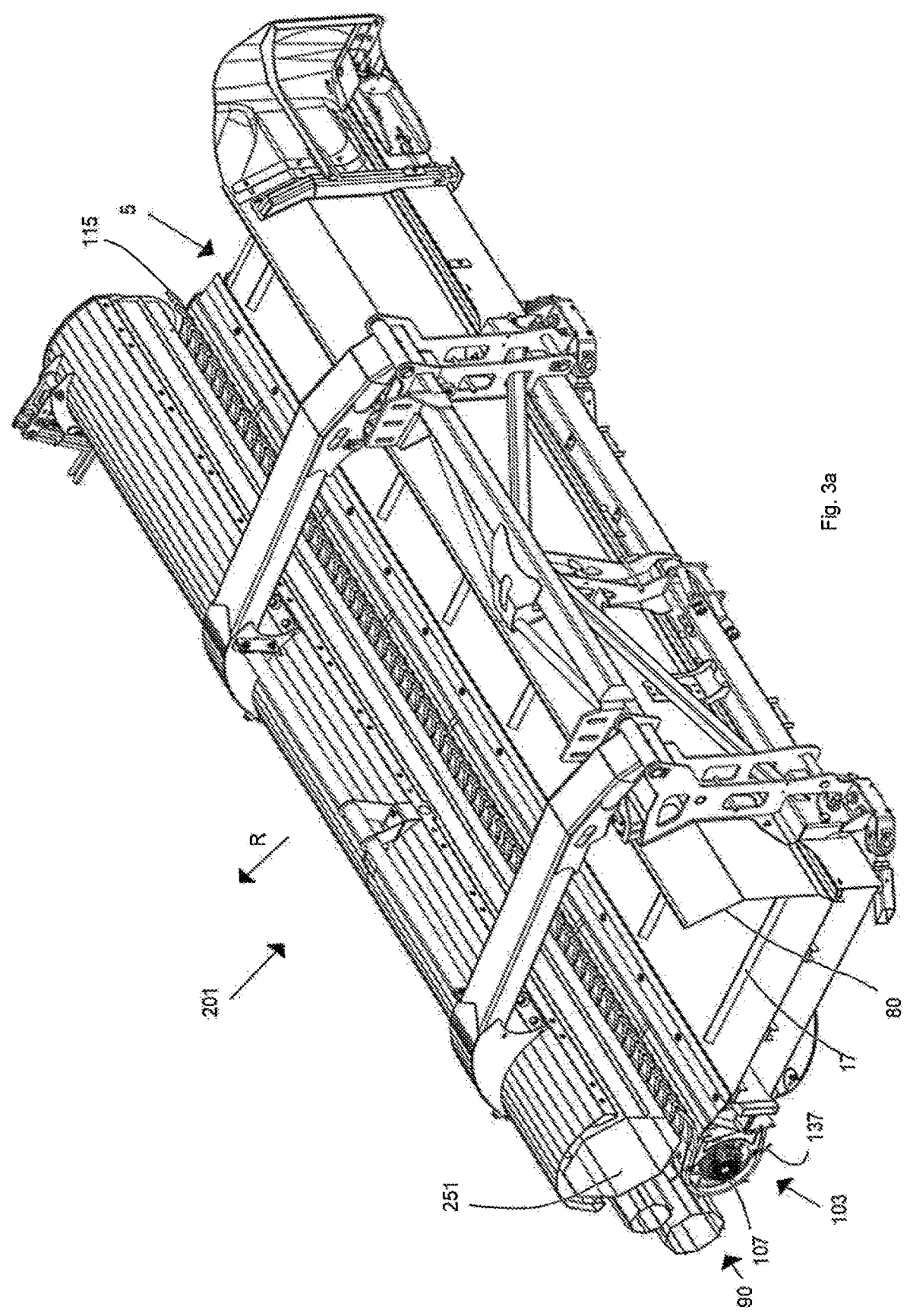
FIGS. 3a,b show a perspective view as well as a cross-section of a third embodiment of a device for use in an agricultural machine.
Figure 3B:
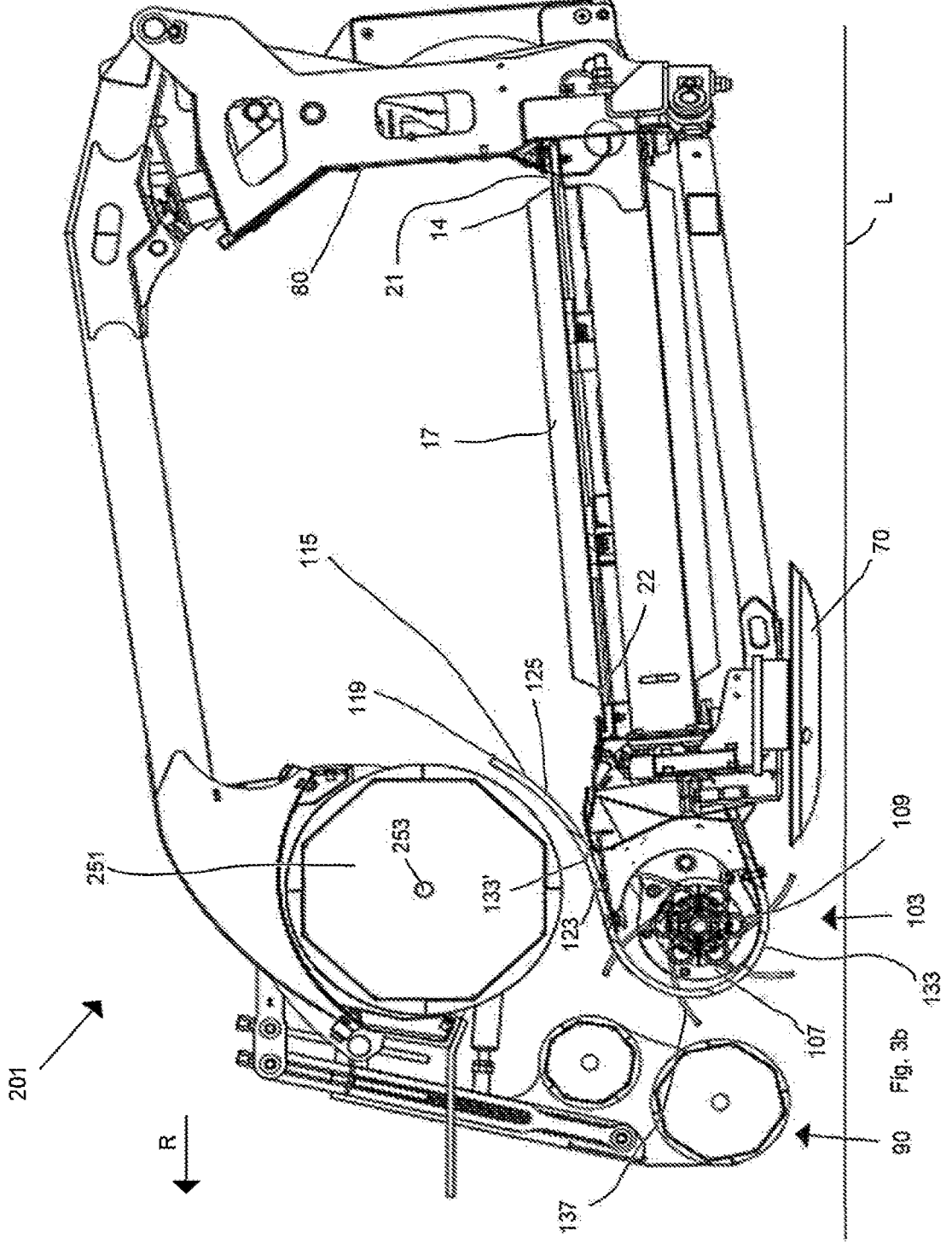

As can clearly be seen in FIGS. 1c, 1d, 2c, 3b, a product outlet side 19; 119 of the guide member 15; 115 directed towards the conveyor belt is located at a height relative to the conveyor belt 5 so that product from the product outlet side 19; 119 falls onto the conveyor belt by means of a falling motion under the effect of gravity. The height difference to be provided by the guide member 15; 115 is at least 100 mm, preferably at least 150 mm. With this falling motion with which the product falls substantially under the effect of gravity onto the conveyor belt 5, the aforementioned advantages of the guide member 15; 115 are achieved. In FIGS. 2c, 3b, the guide member 115 is indicated with hatching, and this hatching can also be seen in FIGS. 2a,b and 3a, wherein it is noted that the hatching does not represent transitions or something similar, but only has an illustrative function. A distance between the land L and the dishes 70 is also shown in FIGS. 1c, 1d, 2c, 3b, wherein it is noted that in operation of the device 1; 101; 201, the dishes 70 are located on the land L for supporting the device 1; 101; 201, so that there is no distance between the land L and the dishes 70.

The product outlet side 19; 119 of the guide member 15; 115 is located at a greater vertical distance from the land L than a maximum distance A1 measured in a vertical direction (FIG. 1c) between the conveyor belt 5 and the land. The maximum distance A1 measured in a vertical direction between the conveyor belt 5 and the land is formed, in the exemplary embodiments shown, by the corners 14 of the ribs 17 near the longitudinal side 21 of the conveyor belt 5 located farthest from the product outlet side 19; 119. More particularly, the longitudinal side 21 of the conveyor belt 5 turned towards the guide member 15; 115 is located at a vertical distance from the land L that is less than a distance measured vertically between the land and a mid-point 25; 125 of the guideway between the product inlet side 23; 123 and the product outlet side 19; 119. The mid-point 25 of the guideway coincides in this case with a fastening point of a support 31 of the guide member, but the position of the fastening point may also be located elsewhere. It is also possible to fasten/mount the guide member 115 near the product inlet side 23, to the device 101 and not support the other part of the guide member 115 in the direction of the product outlet side 119, so that this part is floating, to provide flexibility. However, even with support 31, a part of the guide member 15 between support 31 and product outlet side 19 is to be configured as floating, to provide a flexible guide member 15 with a long service life.

The slope of the guide member 15; 115 is such that the product has a product flow between the pick-up mechanism 3; 103 and the conveyor belt 5 that extends at an angle of at least 20 degrees relative to the horizontal plane (the land L in the figures), and preferably this angle is between 30 degrees and 75 degrees. FIG. 1d shows an enlarged sectional view of FIG. 1c, in which the product flow between land L and conveyor belt 5 is shown schematically with arrows. That is, the pick-up 7; 107 picks up the product from the land and moves it upwards, wherein through the rotating motion of the pick-up, the product moves about the rotation axis of the pick-up, wherein above the rotation axis of the pick-up, the product moves substantially in a horizontal direction (or with a minimum angle relative to a horizontal plane) towards the guide member 15; 115, wherein by means of the guide member 15; 115, the product flow between pick-up 7; 107 and the conveyor belt 5 is moved at an angle of at least 20 degrees relative to the horizontal plane (for example the land L), after which the product lands on the conveyor belt 5 by means of a falling motion.

The guide member 15; 115 forms an inclined guideway for the product between a product inlet side 23; 123 and the product outlet side 19; 119 of the guide member, wherein a percentage rise of the inclined guideway between the product inlet side 23; 123 and the product outlet side 19; 119 is at least 50%, preferably at least 60%. For the guide member 15 (FIG. 1c), the percentage rise between the product inlet side 23 and the product outlet side 19 is for example about 115%, which corresponds to an angle of about 50 degrees between a horizontal line 27 and an imaginary straight line 29 that joins the product inlet side 23 and the product outlet side 19 to each other. For the guide member 15 (FIG. 2c, 3b), the percentage rise between the product inlet side 23 and the product outlet side 19 is for example about 100%, which corresponds to an angle of 45 degrees between a horizontal line and an imaginary straight line that joins the product inlet side 123 and the product outlet side 119 to each other. The guide members 15; 115 shown have a curved guideway, wherein the percentage rise between different sections of the guideway varies. It is also possible to configure the guide members with a straight guideway (not shown), wherein the percentage rise between different sections of the guideway is constant. The guide member 15 is formed by a curved plate-shaped element forming the slope. The slope of the guide member 15 can be made adjustable, for example by moving the plate-shaped element further up or down by means of the support 31, which is configured as vertically movable.

The pick-up 7; 107 extending substantially in the direction of the rotation axis 9; 109 is provided with stationary baleen-shaped strips 33; 133 which, viewed in the direction of the rotation axis 9; 109, are mounted behind one another in such a way that a pitch distance is present between two strips, which defines a slot-shaped opening 35; 135, in which a number of pick-up teeth 37; 137 movable relative to the strips are mounted rotatably about the rotation axis, which, viewed in a radial direction from the rotation axis 9, project relative to the strips 33; 133. A difference between the device 1 shown in FIGS. 1*a*-1*d* and the device 101; 201 shown in FIGS. 2*a*-3*b* is that the stationary guide member 15 is installed between the pick-up mechanism 3 and the conveyor belt 5, whereas the stationary guide member 115 is formed by means of the baleen-shaped strips 133, i.e. the guide member 115 is formed by extending the baleen-shaped strips 133, wherein the extended segments 133' of the strips form the guide member 115. Although not shown, the guide member 115 may also be supported with a support as shown in FIG. 1*c*. It is also noted that the baleen-shaped strips 133, 133' in FIG. 2*a*,*b* and FIG. 3*a* look as if they are built up from different sections owing to the aforementioned hatching in the figures. Technically such a structure is admittedly possible, but in principle the baleen-shaped strips 133, 133' are made as one piece to form the guide member 115. The baleen-shaped strips 133, 133' are manufactured from the same material, more particularly plastic.

The device 1; 101; 201 is further provided with a feed rotor 51; 251 that is mounted above the pick-up mechanism 3; 103, wherein between the feed rotor 51; 251 and the pick-up 7; 107 of the pick-up mechanism 3; 103, a product feed-through is to be provided in the direction of the conveyor belt 5, and between the feed rotor 51; 251 and the guide member 15; 115, a product feed-through is to be provided in the direction of the conveyor belt 5. The feed rotor 51; 251 comprises a rotation axis 53; 253 that extends substantially parallel to the rotation axis 9; 109 of the pick-up 3; 103. The rotation axis 53; 253 of the feed rotor 51; 251 is located, viewed in the (horizontal) direction of travel, between the rotation axis 9; 109 of the pick-up 3; 103 and the conveyor belt 5. More particularly, the rotation axis 53; 253 of the feed rotor 51; 251 is located closer to the rotation axis 9; 109 of the pick-up 3; 103 than the conveyor belt 5. Preferably the rotation axis 53; 253 of the feed rotor 51; 251 is located above an entrance of the guide member 15; 115 formed by the product inlet side 23; 123 or, viewed in the direction of travel R, it is located between the rotation axis 9; 109 of the pick-up 3; 103 and the product inlet side 23; 123 of the guide member 15; 115.

A difference between the device 1; 101 shown in FIGS. 1*a*-2*c* and the device 201 shown in FIG. 3*a*,*b* is formed by the feed rotor 51; 251. In the feed rotor 51 shown in FIGS. 1*a*-2*c*, this is provided with teeth 57 that extend through openings 59 between baleen-shaped rotor strips 61. With the feed rotor teeth 57, the product can be moved in the direction of the conveyor belt 5. The feed rotor 251 shown in FIG. 3*a*,*b* is toothless. This feed rotor 251 is a windrow roll similar to the (windrow) rolls of the feed mechanism 90 to be discussed later, wherein the windrow roll 251 comprises a larger diameter than the rolls 88, 89 of the feed mechanism 90.

Although not shown, the guide member 15 may be provided with recesses configured for receiving, in operation, a part of each feed rotor tooth 57 turned away from the rotation axis 53 of the feed rotor 51.

The guide member 115 is formed by the extended segments 133' of the strips 133. The slot-shaped openings 35 are pierced in the guide member 115 for forming the recesses 135' for receiving the rotor feed teeth 57 at least partly during operation. Because the slot-shaped openings 35 also form the recesses 135' in the extended segments 133', the feed rotor teeth 57 are also aligned with the pick-up teeth 37; 137 of the pick-up 7; 107, so that the grip on the product can be increased and the distance between the pick-up 7; 107 and the feed rotor 51 can be set relatively small without risk of damage of the teeth 57, 37; 137. In particular it is therefore possible, in the case of a device not moving in the direction of travel, for the distance between ends of the feed rotor teeth that are directed towards the guide member 15 and the guide member 15 to be set equal to zero or almost equal to zero. This distance may be adjustable by means of an adjusting mechanism (not shown). By means of the recesses 135' in the guide member 155, it is possible to minimize the distance between the ends of the teeth 57 and the guide member 15 in order to increase the grip on the product with or without a greatly reduced risk of damage during operation of the device through contact between the feed rotor teeth 57 and the guide member 15.

Adjustment of the distance is important in order to minimize or even exclude contact between the feed rotor 51; 251 and the guide member 15; 115 and/or the pick-up teeth 37; 137, during operation of the device. Contact between them is possible because the pick-up 7; 107, at the ends thereof, is fastened by means of at least one spring suspension mechanism (not shown) to the device in such a way that each end of the pick-up 7; 107 is movable by means of the spring suspension mechanism at least in a vertical direction. During this vertical movement of the pick-up 7; 107, the guide member 15; 115 connected thereto is also moved, wherein in the case of a relatively large vertical movement, for example on account of an obstacle on the land, there may be contact with the feed rotor 51; 251. The feed rotor 51; 251 may also be compressed owing to irregularities in the land, so that there may be contact between the guide member 15; 115 and the feed rotor 51; 251. It is even possible for the unit (pick-up, guide member, conveyor belt) to be relatively rigid, not flexible, for example by using wheels in place of the dishes 70 and the spring suspension mechanism shown in the figures, so that in particular the compression of the feed rotor 51; 251 when there are irregularities on the land may lead to contact.

The device 1; 101; 201 is further provided with a feed mechanism 90 comprising at least two rolls 88, 89 mounted substantially parallel as well as rotatably, which are provided for supporting the pick-up mechanism 3 to pick up product from the land, wherein a product throughput is to be provided between each roll 88, 89 and the pick-up 7; 107 of the pick-up mechanism 3. Viewed in the direction of travel R, the pick-up mechanism 3 is installed between the feed mechanism 90 and the conveyor belt 5. The distance between the perimeter of the rolls 88, 89 and the perimeter of the pick-up 7; 107 that provide the product throughputs is relatively small, i.e. smaller than the diameter of each roll 88, 89.

The rolls 88, 89 are mounted in the feed mechanism 90 in such a way that the distance between the land L and a rotation axis of a first roll 88 is less than the distance between the land and a rotation axis of a second roll 89 of the at least two rotatable rolls 88, 89. The two rolls 88, 89 have a different diameter, wherein the roll 88 which, viewed in the direction of travel, is located partially in front of the other roll 89, has the largest diameter. The distance between the rolls 88, 89 mounted one above another is smaller than the smallest diameter, i.e. the diameter of the roll 89. The diameters of the rolls 88, 89 may also be equal, but the difference in diameter shown provides an especially uniform in-feed of the product, even with a relatively wet product. The two rolls 88, 89 are rotatable in the same direction of rotation, to support the pick-up mechanism 3; 103, wherein a direction of rotation of the pick-up 7; 107 for picking up product is opposite to the direction of rotation of the rolls 88, 89. The rotary speed of the rolls 88, 89 and/or of the pick-up 7; 107 depends on the speed of travel, in the direction of travel R, of the device that is movable over the land. By installing at least two rolls 88, 89 and by providing a product throughput between the rolls 88, 89 and the pick-up mechanism 3, the product that is picked-up can be guided more uniformly in the device 1; 101; 201 by means of the rolls 88, 89.

The invention claimed is:

1. A device that is movable in a direction of travel over land, wherein the device is provided with at least one pick-up mechanism for picking up product from the land, as well as at least one conveyor belt, wherein, by means of the conveyor belt, the product picked up by the pick-up mechanism is to be conveyed in at least one direction of transport extending sideways relative to the direction of travel and is to be deposited on the land, wherein the pick-up mechanism comprises at least one pick-up that is configured to pick up product from the land by means of a rotating motion about a rotation axis extending substantially parallel to the direction of transport of the conveyor belt, wherein the device is provided with a guide member forming a rising slope for the product, by means of which the product picked up from the land by means of the pick-up mechanism is to be moved towards the conveyor belt at an angle of at least 20 degrees relative to a horizontal plane, wherein the guide member is provided with a curved plate-shaped element forming the slope, and wherein the guide member is mounted between the pick-up and the conveyor belt.

2. The device according to claim 1, wherein the guide member forms an inclined guideway between a product inlet side and a product outlet side of the guide member, wherein a percentage rise of the inclined guideway between the product inlet side and the product outlet side is at least 50%.

3. The device according to claim 1, wherein a height difference between the guide member and the pick-up is at least 100 mm when viewed in a vertical direction.

4. The device according to claim 2, wherein a longitudinal side of the conveyor belt facing the guide member is located at a vertical distance from the land that is less than a distance measured vertically between the land and a mid-point of the guideway between the product inlet side and the product outlet side.

5. The device of claim 1, wherein the slope to be formed by the guide member between the pick-up mechanism and the conveyor belt is adjustable.

6. The device of claim 1, wherein a working width of the guide member extending transversely to a product guiding direction of the guide member corresponds substantially to a working width of the pick-up mechanism with which product is to be picked up from the land by means of the pick-up mechanism.

7. The device of claim 1, wherein the pick-up extending substantially in the direction of the rotation axis is provided with strips, which are mounted behind one another viewed in the direction of the rotation axis in such a way that a pitch distance is present between two strips, which defines a slot-shaped opening, in which a number of movable pick-up teeth are mounted rotatably about the rotation axis relative to the strips which, viewed in a radial direction from the rotation axis, project relative to the strips.

8. The device according to claim 7, wherein the guide member is formed by extending the strips, wherein the extended segments of the strips form the guide member.

9. The device of claim 1, further comprising with a feed rotor, which is mounted above the pick-up mechanism, wherein, between the feed rotor and the pick-up of the pick-up mechanism, a product feed-through is to be provided in the direction of the conveyor belt, and/or between the feed rotor and the guide member, a product feed-through is to be provided in the direction of the conveyor belt.

10. The device according to claim 9, wherein the feed rotor comprises a rotation axis that extends substantially parallel to the rotation axis of the pick-up.

11. The device of claim 9, wherein the feed rotor is a windrow roll.

12. The device of claim 9, wherein the feed rotor is provided with feed rotor teeth, wherein the guide member is provided with recesses configured to receive, in operation, a part of each feed rotor tooth turned away from the rotation axis of the feed rotor.

13. The device of claim 7, wherein the feed rotor teeth viewed in the direction of the rotation axis of the feed rotor are mounted next to each other at an equal pitch distance, wherein a pitch distance is equal to or is a multiple of the pitch distance of the pick-up teeth or vice versa.

14. The device of claim 12, wherein in the case of a device not moving in the direction of travel, ends of the feed rotor teeth that are directed towards the guide member are located at a distance from the guide member.

15. The device of claim 1, wherein the pick-up is fastened, at the ends thereof, by means of at least one spring suspension mechanism to the device in such a way that each end of the pick-up is movable at least in a vertical direction by means of the spring suspension mechanism.

16. The device of claim 1, wherein the device is provided with a deflecting member for deflecting product arriving from the guide member, towards a conveyor belt.

17. The device of claim 1, further comprising a feed mechanism comprising at least two rolls mounted substantially parallel as well as rotatably that are provided for supporting the pick-up mechanism to pick up product from the land, wherein a product throughput is to be provided between each roll and the pick-up mechanism, wherein, viewed in the direction of travel, the pick-up mechanism is installed between the feed mechanism and the conveyor belt.

18. A self-propelled agricultural machine provided with the device of claim 1.

19. A pulled agricultural machine that is provided with the device of claim 1.

* * * * *